(12) United States Patent
Tan et al.

(10) Patent No.: US 8,761,550 B2
(45) Date of Patent: Jun. 24, 2014

(54) OPTICAL TAPS FOR CIRCUIT BOARD-MOUNTED OPTICAL WAVEGUIDES

(75) Inventors: Michael Renne Ty Tan, Menlo Park, CA (US); Paul Kessler Rosenberg, Sunnyvale, CA (US); Terrel Morris, Garland, TX (US); Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 917 days.

(21) Appl. No.: 12/864,228

(22) PCT Filed: Jan. 31, 2008

(86) PCT No.: PCT/US2008/052716
§ 371 (c)(1),
(2), (4) Date: Oct. 22, 2010

(87) PCT Pub. No.: WO2009/096981
PCT Pub. Date: Aug. 6, 2009

(65) Prior Publication Data
US 2011/0033150 A1    Feb. 10, 2011

(51) Int. Cl.
*G02B 6/12* (2006.01)

(52) U.S. Cl.
USPC .......... 385/14; 385/15; 385/31; 385/50; 385/78; 385/88; 385/89

(58) Field of Classification Search
USPC .............. 385/14–15, 18, 31, 50, 88, 89
See application file for complete search history.

(56) References Cited

U.S. PATENT DOCUMENTS

| | | | |
|---|---|---|---|
| 5,613,020 A * | 3/1997 | Uchida et al. | 385/9 |
| 5,710,854 A | 1/1998 | Myers et al. | |
| 5,867,622 A | 2/1999 | Miyasaka et al. | |
| 6,422,761 B1 | 7/2002 | Naghski | |
| 6,751,376 B2 * | 6/2004 | Hammond | 385/31 |
| 6,939,058 B2 * | 9/2005 | Gurevich et al. | 385/93 |
| 7,082,251 B2 | 7/2006 | Kurumada et al. | |
| DE 100A1261 | | 10/2001 | |
| DE 60302553 | | 6/2006 | |

(Continued)

FOREIGN PATENT DOCUMENTS

| CN | 1643413 A | 7/2005 |
|---|---|---|
| CN | 1643422 A | 7/2005 |

(Continued)

OTHER PUBLICATIONS

Alexei L. Glebov, et al., "Integration technologies for pluggable backplane optical interconnect systems", Optical Engineering vol. 46(1), 015403, Jan. 2007, pp. 015403-1 to 015403-10.

*Primary Examiner* — Ryan Lepisto
*Assistant Examiner* — Guy Anderson

(57) ABSTRACT

A method for installing an optical tap into an optical waveguide formed in a printed circuit board which comprises obtaining a printed circuit board having an optical waveguide formed therein, cutting a transverse groove that has a front plane and a back plane into the optical waveguide, such that the back plane of the groove forms an oblique angle relative to the incident beam of light, and inserting a pre-fabricated beamsplitter into the groove so that the beamsplitter is positioned at the oblique angle of incidence relative to the beam of light to enable a predetermined portion of the beam of light to be directed out of the waveguide.

22 Claims, 5 Drawing Sheets

(56) References Cited

U.S. PATENT DOCUMENTS

| | | | |
|---|---|---|---|
| 7,428,351 B2* | 9/2008 | Jenkins et al. | 385/14 |
| 2003/0142925 A1* | 7/2003 | Melchior et al. | 385/89 |
| 2003/0152336 A1 | 8/2003 | Gurevich et al. | |
| 2004/0067025 A1 | 4/2004 | Haraguchi et al. | |
| 2005/0036740 A1 | 2/2005 | Itabashi et al. | |
| 2006/0171626 A1* | 8/2006 | McNie et al. | 385/14 |
| 2006/0226576 A1* | 10/2006 | O'Brien et al. | 264/293 |
| 2007/0237456 A1* | 10/2007 | Blauvelt et al. | 385/34 |
| 2007/0248139 A1* | 10/2007 | Bischel et al. | 372/75 |
| 2007/0296970 A1* | 12/2007 | Crow et al. | 356/328 |

FOREIGN PATENT DOCUMENTS

| | | |
|---|---|---|
| EP | 0171615 A2 | 2/1986 |
| EP | 0822430 A2 | 2/1998 |
| JP | 58-202423 | 11/1983 |
| JP | H09-043458 | 2/1997 |
| JP | H09-281355 | 10/1997 |
| JP | 10010343 A | 1/1998 |
| JP | 2003-248145 | 9/2003 |
| JP | 2005-516253 | 6/2005 |
| JP | 2007-058098 | 3/2007 |
| JP | 2007-212902 | 8/2007 |
| WO | WO/03/096095 | 11/2003 |

* cited by examiner

OPTICAL TAPS FOR CIRCUIT BOARD-MOUNTED OPTICAL WAVEGUIDES

BACKGROUND OF THE INVENTION

As computer chip speeds on circuit boards increase to ever faster speeds, a communications bottleneck in inter-chip communication is becoming a larger problem. One likely solution is to use fiber optics to interconnect high speed computer chips. However, most printed circuit boards ("PCB's") involve many layers and often require tolerances in their manufacture of less than a micron. Physically placing fiber optics and connecting the fibers to the chips can be too inaccurate and time consuming to be widely adopted in circuit board manufacturing processes.

Routing the optical signals around and between circuit boards can add significant additional complexity. Marketable optical interconnects between chips have therefore proven elusive, despite the need for broadband data transfer.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict exemplary embodiments of the present invention and are not to be considered limiting of its scope, and that the components of the invention, as generally described and illustrated in the figures herein, could be arranged and designed in a wide variety of different configurations. Nonetheless, the present invention will be described and explained with additional specificity and detail through the use of the accompanying drawings, in which.

DETAILED DESCRIPTION OF EXEMPLARY EMBODIMENTS

Figure 1:
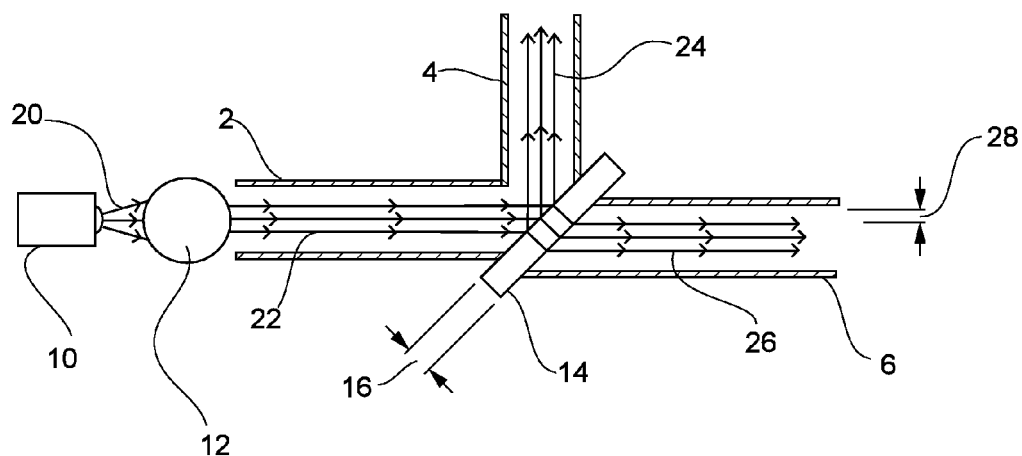
FIG. 1 is an illustration of the operation of a conventional beamsplitter in common optical waveguide applications.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. As such, the following more detailed description of the embodiments of the present invention is not intended to limit the scope of the invention as it is claimed, but is only presented for purposes of illustration: to describe the features and characteristics of the present invention; to set forth the best mode of operation of the invention; and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

One method for constructing optical interconnects between computer chips on a circuit board is to use optical waveguides formed in the circuit board. Optical waveguides can be superior to fiber optic communications for inter-connecting electronics because of the ability to form the waveguides on the circuit board using lithographic, embossing or similar processes. The optical waveguides can be fabricated in the circuit boards with a core of substantially optically transparent materials, such as polymers and/or dielectrics, surrounded by a lower index cladding, which together form solid core waveguides. In the alternative, the PCB-mounted optical waveguides can also be formed as large core hollow waveguides having wall surfaces lined with a reflective coating that surround a hollow center.

Solid core waveguides can be advantageous by providing interconnects that are constructed with the necessary physical tolerances to be used on modern multi-layer circuit boards. These optical pathways can be manufactured to have dimensions that are roughly proportional with the wavelength of light they are designed to carry. For example, a single mode solid core waveguide configured to carry 1000 nm light may have its largest dimension of 1000 nm to 8000 nm (1 μm to 8 μm), while multimode waveguides may have slightly larger dimensions, on the order of 20-200 μm for the core region. Solid core waveguides can also be formed on other types of substrates that are not mounted on a printed circuit board, such as a flexible substrate to create a ribbon cable having one or more optical waveguides.

The polymers, dielectrics, and other materials that can be used in chip and circuit board manufacture to form the on-board solid core waveguides are typically significantly more lossy than glass fiber optics. Indeed, the amount of loss in polymer-based waveguides has been one of the factors limiting the acceptance of optical waveguide interconnects. Polymers used to construct the waveguides can have a loss of 0.1 dB per centimeter. In contrast, the loss in a fiber optic is around 0.1 dB per kilometer. Thus, solid core waveguides can have losses that are orders of magnitude greater than the loss in fiber optics.

An alternative to solid core waveguides are large core hollow waveguides, which can have a diameter (or width and/or height) on the order of 50 to 150 or more times a wavelength of the coherent light the waveguide is configured to guide. The large core hollow waveguide can have a cross-sectional shape that is square, rectangular, round, elliptical, or some other shape configured to guide an optical signal. Because the waveguide is hollow, the light essentially travels at the speed of light in air or a vacuum.

The reflective coating can be comprised of one or more layers of metal, dielectrics, or other materials that are substantially reflective at the wavelength of the coherent light. The metals can be selected based on their reflectivity. A highly reflective layer covering the channel is desired. For example, the reflective layer may be formed using silver, gold, aluminum, or some other metal or alloy that can form the highly reflective layer. Alternatively, the reflective layer may be a dielectric stack which can be formed from one or more layers of dielectric material that is substantially reflective at a selected wavelength.

The reflective coating can be formed using a plating, sputtering, or similar process, as can be appreciated. However, before the reflective layer is deposited, the uncoated hollow channel may be subject to a heat reflow to smooth out any surface roughness. The reflective layer may also undergo a heat reflow or similar process to smooth surface roughness in the reflective layer that may occur during the deposition process. Electro-polishing may also be used to smooth out the reflective metal surface.

Hollow waveguides having reflective surfaces operate differently than solid core waveguides. Hollow waveguides work using the principle of attenuated total internal reflection guiding light through reflection from the reflective layer(s) and not through total internal reflection between a higher index core region and a lower index cladding region, as typically occurs in solid core waveguides. The light within the hollow waveguide may be reflected at angles less than what is necessary for total internal reflection, as can be appreciated.

For a circular hollow waveguide, the $TE_{01}$ mode has an attenuation per unit length that can be determined according to equation 1:

$$\alpha_c = \frac{R_s}{a\eta} \cdot \frac{(\omega_c/\omega)^2}{\sqrt{1-(\omega_c/\omega)^2}}, \quad (1)$$

where $\alpha$ is the waveguide radius, $\omega$ is the frequency of the light in radians, $\omega_c$ is the $TE_{01}$ cut-off frequency and $\eta$ is the impedance of free space. The attenuation in the hollow waveguide is due to the finite conductivity or finite reflectivity of the metal walls. $R_S$ is the surface resistivity of the metal and is given by:

$$R_s = \frac{1}{\sigma\delta} = \sqrt{\frac{\pi f \mu}{\sigma}}, \quad (2)$$

where $\sigma$ is the conductivity, $\delta$ is the depth of penetration of the light into the metal, $\mu$ is the permeability of the metal and f is frequency of light. It can be seen that $R_S$ increases as the square root of f.

From equation (1) above, it can be seen that the attenuation for the $TE_{01}$ mode decreases with increasing frequency. The decrease in attenuation at increasing frequencies occurs because the mode is not coupled to the guide walls at high frequencies. There are also higher order modes which exist in the hollow metal waveguide. However, these modes are very lossy since they are more coupled to the metal walls (i.e. they suffer more reflection due to their higher numerical aperture). At waveguide bends and discontinuities the $TE_{01}$ mode will be attenuated due to mode conversion to the higher order modes. The lowest loss mode can be described by a set of rays which only graze the reflective wall at a steep angle from the normal resulting in a fewer number of bounces as it propagates down the waveguide. For this reason, the low loss mode has a very small numerical aperture as compared to conventional waveguide. In other words, the beam exiting the hollow core waveguide is highly collimated.

Ideally, a single mode laser is typically used to direct coherent light into a hollow waveguide. However, single mode lasers can be relatively expensive. It has been discovered that a less expensive, multi-mode laser such as a vertical-cavity surface-emitting laser (VCSEL) can be useful in communicating high data rate signals through relatively short distances using hollow waveguides having reflective inner surfaces. For example, multi-mode lasers can be used to direct high data rate signals through large core hollow reflective waveguides used inter-chip and inter-circuit board connections. The use of multi-mode lasers can significantly decrease the cost of optical interconnects, enabling their use to interconnect a much wider variety of electronic devices. However, multi-mode laser output can have significantly greater losses when directly coupled to a hollow metal waveguide due to multiple reflections of higher modes which propagate at large angles.

As illustrated in FIG. 1, a collimator 12 can be placed within a path of the multi-mode coherent light rays 20 emitted from the multi-mode laser 10 to overcome the attenuation of the higher modes emitted from the laser. The collimator can be a collimating lens or series of lenses, which converts the diverging output of the multi-mode laser into a collimated low numerical aperture beam. In one embodiment, the collimator can be configured as a ball lens. The ball lens can have an anti-reflective coating. In another embodiment, the collimator may be an aspheric lens.

The collimator 12 is configured to collimate the multi-mode beam to cause a plurality of the multiple modes, or rays 20 emitted from the laser 10 to form a collimated beam 22 in which the rays travel substantially in parallel within the large core hollow waveguide 2. Collimation of the multi-mode beam can be used to efficiently couple the multimode laser to the low loss mode of the hollow metal waveguide by launching rays which are nearly parallel to the waveguide, substantially reducing the number of reflections that occur within the waveguide. Reflections of the collimated beam that do occur within the waveguide will typically be at a relatively shallow angle with respect to the waveguide walls, thus minimizing the number of reflections within the waveguide and therefore reducing the attenuation of the light within the hollow waveguide.

Significant losses can occur within a hollow metal waveguide if the optical pathway through the waveguide is not substantially straight, or if the beam bounces between the walls instead of traveling down the center of the waveguide. Therefore, alignment of the beam of light in the center of the optical waveguide is critical. Hollow metal waveguides are made as straight as possible, since bends or turns can cause the light to have an unwanted number of bounces that leads to increased attenuation. To enable optical signals to be routed in a different direction, mirrors, splitters, and lenses can be used.

It has been recognized that an inexpensive optical interconnect, such as a beamsplitter 14, can be a cost-effective solution to interconnecting with other waveguides and optical devices. It has also been found that using beamsplitters can provide for precise control of the power tap ratio, also known as the power ratio between the incident optical beam 22, the reflected optical beam 24 and the transmitted optical beam 26. By using a beamsplitter to control the power of both the reflected optical beam 24 and the transmitted optical beam, multiple optical taps 4 can be arranged along the same optical waveguide 2, allowing for the routing of optical signals around and between circuit boards in an optimal manner.

The installation of beamsplitters into board-mounted waveguides can be difficult to accomplish. As illustrated in FIG. 1, one common problem is the significant amount of beam walk-off 28 that can occur within the beamsplitter 14. Beam walk-off is the phenomenon which results from a change in an index of refraction between the core medium of the waveguide 2 and the beamsplitter material. The incident beam 22 is refracted as it enters the beamsplitter, and then refracted back as the transmitted beam 26 exits the back surface. The angle at which the refractions occur depends on the difference in the index of refraction between the waveguide medium and the beamsplitter material. Beam walk-off is the lateral distance that the beam travels due to the refraction through the beam splitter. Beam walk-off is typically proportional to the thickness 16 of the optical device, in this case the beamsplitter 14. The lateral displacement of the light within the hollow metal waveguide leads to increased attenuation due to excitation of higher order modes as the beam of light couples with the walls of the waveguide. Thus it is important to minimize beam walk-off.

Figure 9:
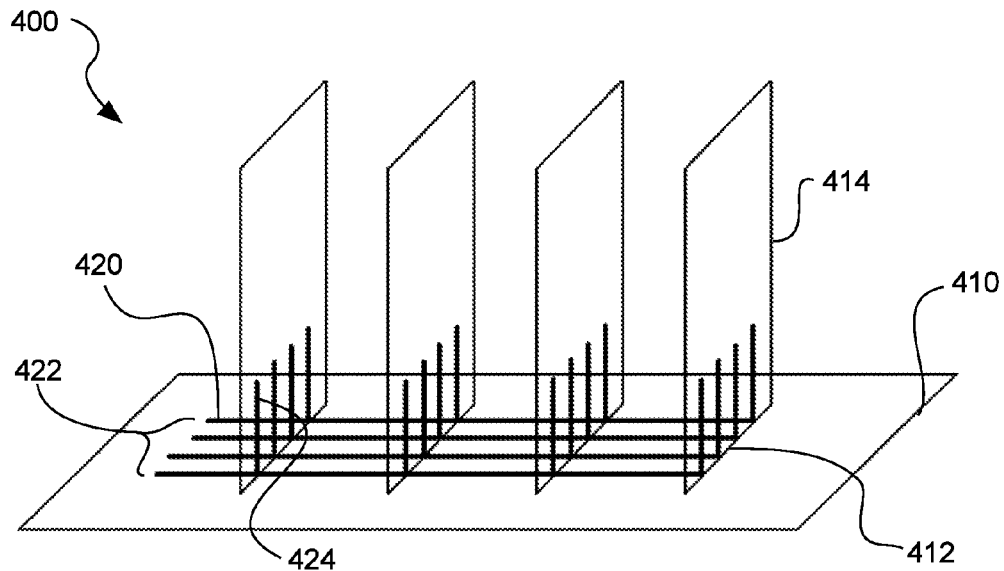
FIG. 9 illustrates a beamsplitter installation in accordance with yet another embodiment of the present invention.

Beam walk-off 28 can appear exaggerated when using comparatively small optical waveguides 2, as the diameter of the optical pathway inside the waveguide can be on the same order of magnitude as the thickness 16 of the beamsplitter 14. This lateral displacement of the beam of light can be compounded if multiple optical taps 4 are arranged sequentially along the same optical waveguide, and all the beamsplitters are orientated to redirect the beam of light in the same direction. This configuration can be found with a circuit board-mounted optical backplane that is optically connected to multiple daughter cards, as illustrated in FIG. 9. Each optical tap contributes additional lateral displacement until the beam of light is outside the desired transmission area, causing significant loss due to coupling with the sides of the waveguide.

As shown FIG. 1, to compensate for the lateral shift of the beam walk-off, the optical waveguide 2 can be laterally shifted by a distance equal to the offset of the beam of light 28, to form a shifted output waveguide 6. Laterally shifting waveguides at each junction to compensate for beam walk-off, however, can substantially complicate manufacturing and significantly increase costs. This can be especially detrimental in the PCB-mounted optical backplane application with out-of-plane optical taps, as any lateral offset to compensate for beam walk-off would be in the vertical direction, causing each shifted output waveguide to be fabricated at different depths, thereby causing potential interference between multiple circuit layers within the circuit board.

Another method for directing the beam of light out of the plane of the circuit board can be to eliminate the beamsplitter completely and replace it with a silvered mirror which is integrally formed with the PCB. However, this solution requires additional fabrication steps and does not allow multiple optical tap locations off the same waveguide, as the integral mirror reflects 100% of the incident light without transmitting any portion of the beam of light forward to the next tap location. This could defeat the objective of forming an optical bus or backplane that can have multiple optical taps branching off from the same optical waveguide.

Finally, despite the differences in relative sizes between the solid core waveguide and the large core, hollow waveguide, both types of optical pathways are still extremely small in size. Because of their small dimensions, connecting any optical waveguide formed in a circuit board can be expensive and challenging, which has historically reduced their use in most common applications.

As a result of the above-identified deficiencies, it has been recognized that an improved method is needed for installing optical taps in optical waveguides formed in a circuit board. It has been found that a pre-fabricated beamsplitter can be inserted into the optical waveguide to control the power tap ratio of the optical beam as it passes through the optical tap, allowing additional taps to be attached to the same waveguide. It has also been found that the pre-fabricated beamsplitter can be matched to the category of optical waveguide to minimize or substantially reduce beam walk-off. It has been discovered that the installed beamsplitter can be secured against accidental displacement or removal, and protected from contamination by foreign particles, dust or moisture. And it has been further recognized that the method can decrease costs by reducing the number of steps required in the installation process.

The present invention discloses a method for selecting one or more pre-fabricated beamsplitters for installation into an optical waveguide formed into a printed circuit board. Alternatively, the optical waveguides may be formed in other substrates, such as a metallic panel, a ceramic panel, a glass panel, a plastic panel and the like. The method provides for accurate positioning of the beamsplitter within the optical waveguide by cutting a precision groove into the optical waveguide having a desired depth. A back face of the groove can form an oblique angle relative to the incident beam of light. The method further includes inserting the pre-fabricated beamsplitter into the groove such that it both assumes the oblique angle of incidence of the back face and registers against the registering corner of the groove. The method further comprises selecting the depth of the groove so that the optical pathway of the beamsplitter is aligned with the center passage or core of the optical waveguide.

The method also includes the selection of the most appropriate pre-fabricated beamsplitter for use with a particular type of optical waveguide. For example, a plate beamsplitter can be effectively used with a solid core waveguide to minimize beam walk-off when the index of refraction of the plate material is substantially matched to the index of refraction of the core material. This configuration can be optimized by filling any remaining empty space between the plate beamsplitter and the front wall of the groove with an adhesive which also has an index of refraction that matches the index of refraction of the core material. The index-matching adhesive can serve to minimize beam walk-off, secure the beamsplitter against unwanted displacement, and to protect the optical tap from contamination from dust particles or foreign matter.

The method further includes the selection of a pellicle beamsplitter for use with a large core, hollow metal waveguide in which the core medium is air or a vacuum. The membrane of the beamsplitter can be configured to be sufficiently thin that it produces negligible walk-off, even after passing through multiple optical taps. Plate beamsplitters with one or more empty through-holes that allow the unrestricted passage of a portion of the incident beam of light through the beamsplitter can also be selected for use with large core hollow waveguides. As the cutting of a transverse groove into the hollow metal waveguide exposes an empty interior and a perimeter surface of both the front and back faces, the method can also comprise coating the perimeter surface of the back face with an adhesive prior to inserting the pellicle beamsplitter into position in order to prevent misalignment or removal of the beamsplitter after the adhesive has set. The method can further include covering the groove with a transparent cover to protect the pellicle beamsplitter or plate beamsplitters with an empty through-hole from contamination.

Figure 2:
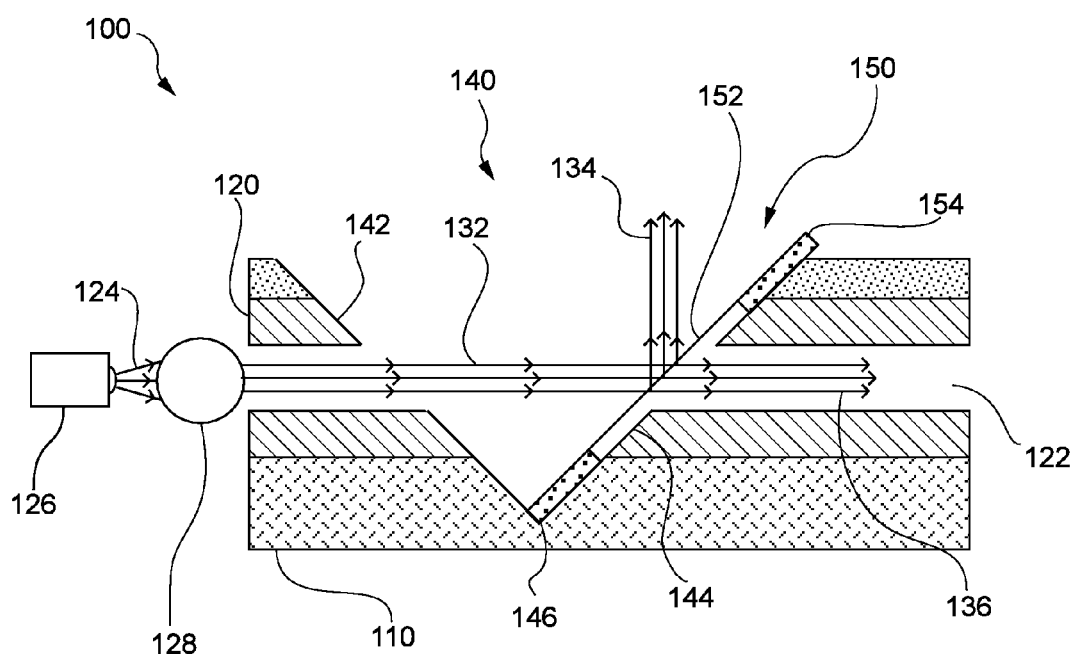
FIG. 2 illustrates the installation of a beamsplitter, in accordance with an exemplary embodiment of the present invention.

With reference to FIG. 2, illustrated is an exemplary embodiment 100 of the present invention in which a pellicle beamsplitter 150 has been installed into a large core hollow waveguide 120. The optical waveguide can be formed in a printed circuit board 110, and has a hollow light passage 122 surrounded by sidewalls 124. The interior of the sidewalls can be coated with a reflective coating (not shown). An optical light source 126, such as a multi-mode laser, can be located at one end of the waveguide and can be coupled into the signal processes of the circuit board to create an optical signal that can be routed around and between circuit boards. In an alternative embodiment, the optical waveguide can be formed on a substrate other than a printed circuit board, such as a panel or substrate made from metallic, ceramic, glass, plastic or some combination of these materials.

The light source 126 can emit a beam of multi-mode light that travels down the central light passage 122. A collimator 128 can be placed within the passage and adjacent the light source, to collimate the multi-mode light into a collimated beam of coherent light rays 132 in which the multiple modes travel substantially in parallel within the hollow metal waveguide 120.

A beamsplitter 150, in this case a pellicle beamsplitter, can be inserted into a transverse groove 140 which has been cut into the optical waveguide 120. The groove can be cut with a microdicer or dicing saw having a blade with a diamond-tipped edge, or with any other device capable of making a precision cut to a controlled depth, accurate to within a few micrometers, and leaving a groove with a substantially smoothly-finished front face plane 142 and a back face plane 144. As shown in FIG. 2, the groove also has a bottom notch or corner 146 where the two planes come together, which can provide a registered fit for the bottom of the beamsplitter 150 to allow passive placement of the pellicle beamsplitter into the waveguide.

The registering corner 146 can have substantially the same profile as the tip of the blade of the dicing saw. For example, if the dicing saw has a V-shaped blade with two surfaces at 90 degree angles relative to one another (a 90 degree profile), the registering corner of the groove will have a 90 degree angle. And if the blade having a 90 degree profile is aligned to the vertical, the front face 142 and back face 144 will both be aligned at 45 degrees to the horizontal plane of the circuit board and the optical axis of the waveguide.

Although the embodiment illustrated in FIG. 2 has a 90 degree profile, the method of the present invention is not limited to microdicer blades having a 90 degree profile, a V-shaped profile, or even to a microdicer blade. Any means for cutting a groove having a profile which can precisely accommodate, align and hold a pre-fabricated beamsplitter is considered to fall within the scope of the present invention. This includes V-shaped blades, right angle shaped blades, as well as blades having a square, polygonal or rounded tip shape.

The pellicle beamsplitter 150 has a membrane 152 supported by a frame 154, which can fit into the registered fit formed by the registering corner 146. The transverse groove can be precisely cut to a depth which automatically aligns the membrane's central optical path with the hollow light passage 122 of the waveguide once the beamsplitter is inserted into the groove. Alternatively, the size of the membrane beamsplitter can be made larger than the waveguide core thus making it insensitive to the placement of the pellicle beamsplitter. The beamsplitter can be sized to rest against the back face plane 144 of the groove, and assume the oblique angle of the back face relative to the incident optical beam 132 emitted from light source 126. The beamsplitter membrane and frame can be precisely manufactured to be flat and parallel to each other, so that the final angular position of the membrane in the waveguide is solely determined by the angle of the transverse groove.

Once the incident beam strikes the membrane of the beamsplitter, a reflected portion 134 of the light is directed up through the top opening in the groove and out from the plane of the circuit board, and the remaining transmitted portion 136 of the beam is passed through the membrane to continue further along the optical waveguide 120.

Figure 3:
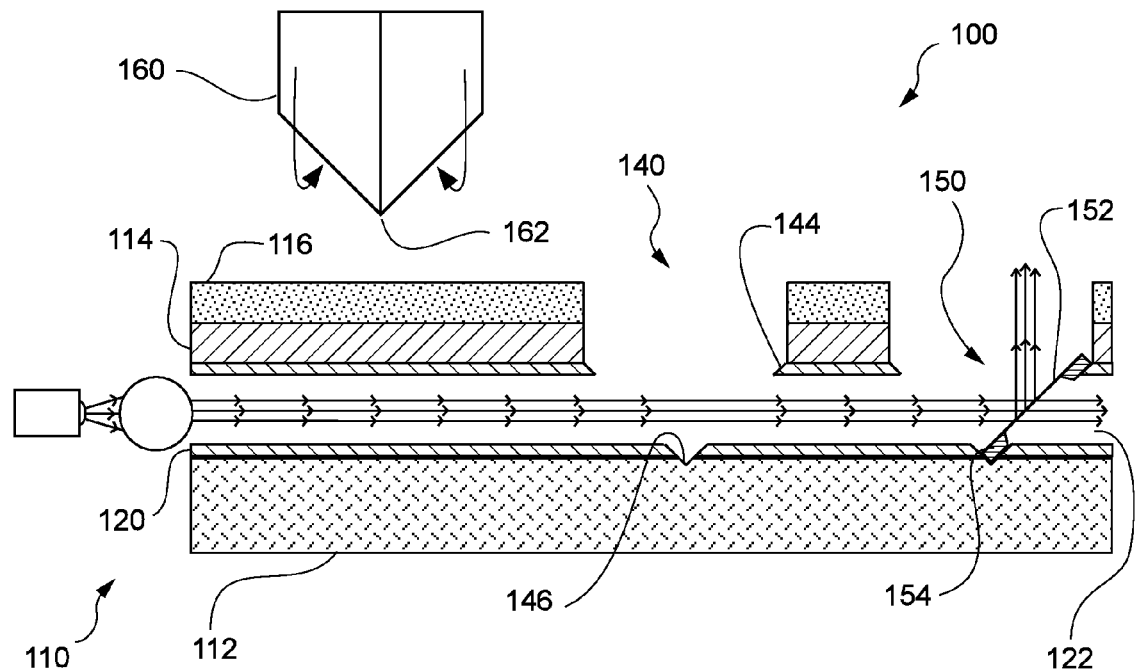
FIG. 3 illustrates the installation of multiple beamsplitters, in accordance with an exemplary embodiment of the present invention.

The embodiment 100 of the present invention is further shown in FIG. 3, in which a microdicer blade 160 having a V-shaped tip 162 with a 90 degree profile is used to cut a groove 140 into the hollow metal waveguide 120. FIG. 3 further illustrates the aspect of the present invention that it is not necessary for the waveguide be formed on the top surface of the circuit board 110, but can be formed within the circuit board, such as above intermediate layer 112 but below intermediate layer 114 and top layer 116. Thus, the microdicer blade can cut through overlying layers 114 and 116 before reaching the hollow waveguide 120. Alternatively, additional layers can be fabricated over the hollow waveguide after the pellicle beamsplitter 150 has been inserted into the groove. The additional layers can include a through hole or via through which the reflected light beam can travel.

Regardless of the placement of the waveguide on or within the circuit board 110, the microdicer blade 160 can be precision controlled to cut the groove 140 to a depth which creates the registering corner 146 in the lower portion of the waveguide. In one embodiment, the dimensions of the back face plane 144 of the groove can match the dimensions of the beamsplitter 150, so that the frame 154 of the beamsplitter can lay flat against the back face of the groove when the bottom portion of the beamsplitter fits into the registering corner, and the optical path of the membrane 152 is substantially aligned with the central light passage 122 of the hollow waveguide. In an alternative embodiment, the size of the pellicle beamsplitter can be made larger than the size of the waveguide to make the final alignment relatively insensitive to placement depth.

Also illustrated in FIG. 3 is the aspect of the present invention in which multiple beamsplitters 150 can be in installed on the same optical waveguide 120. Several grooves 140 can be formed at select locations along the length of the waveguide by making multiple cuts with the microdicer blade. A beamsplitter 150 can be installed in each groove to form an optical tap, and the power tap ratio of each beamsplitter membrane 154 can be controlled to provide a desired amount of reflected output at each tap location. This feature of the present invention is advantageous over prior methods, such as forming a waveguide with an integral mirror, because it allows for more than one optical tap on each waveguide. Additionally, each tap can be easily created by cutting the waveguide and inserting the pre-fabricated beamsplitter.

Figure 4:
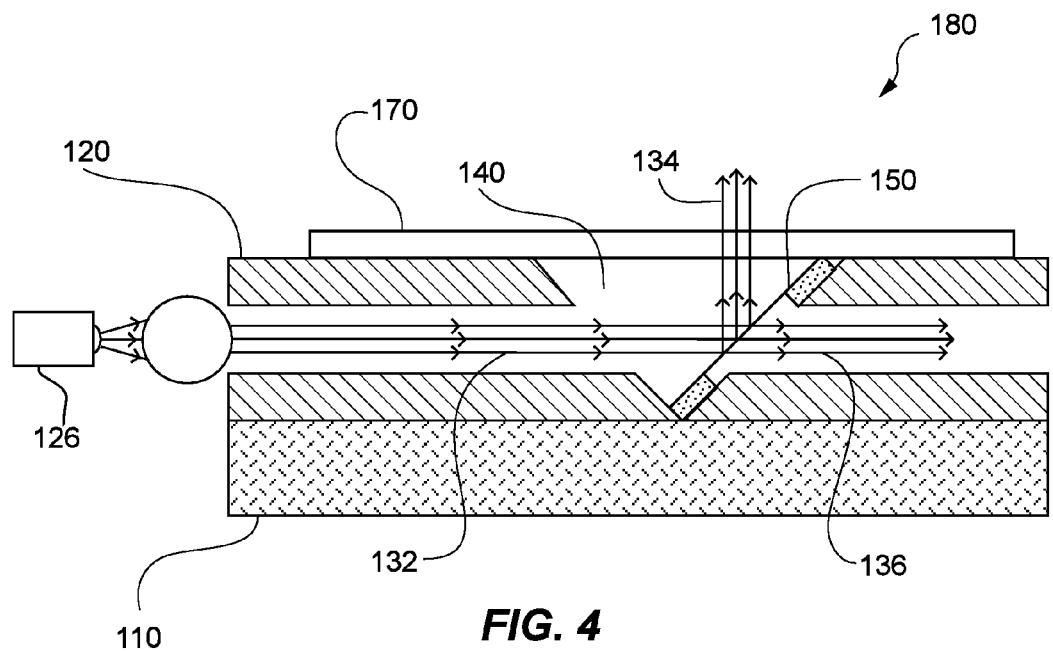
FIG. 4 illustrates the installation of a beamsplitter into a hollow waveguide with a transparent cover over the groove in accordance with an exemplary embodiment of the present invention.

FIG. 4 illustrates the additional aspect 180 of the present invention of covering the groove 140 cut into the hollow waveguide 120 with a substantially optically transparent cover 170 after the installation of the pellicle beamsplitter 150. The extremely small size of the optical waveguide and beamsplitter make the optical tap very sensitive to foreign matter such as dust particles or moisture. Even a small grain of dust could completely block the reflected beam of light 134 if it were to become lodged in the groove. The cover can be made from any material that is transparent to the frequency of the optical beam 132 emitted by the light source 126 and reflected upwards 134 by the beamsplitter. The transparent cover can be placed over the groove opening as a pre-fabricated cover, or formed during one of the separate steps in the fabrication of the circuit board 110. Moreover, the optically transparent cover can bridge the opening of the groove as a solid structure, as shown in FIG. 4, or sag or droop down into the groove as a film or viscous paste before curing. Alternatively, the photodetector, instead of a transparent cover, can be directly placed over the optical tap preventing contamination.

Figure 5:
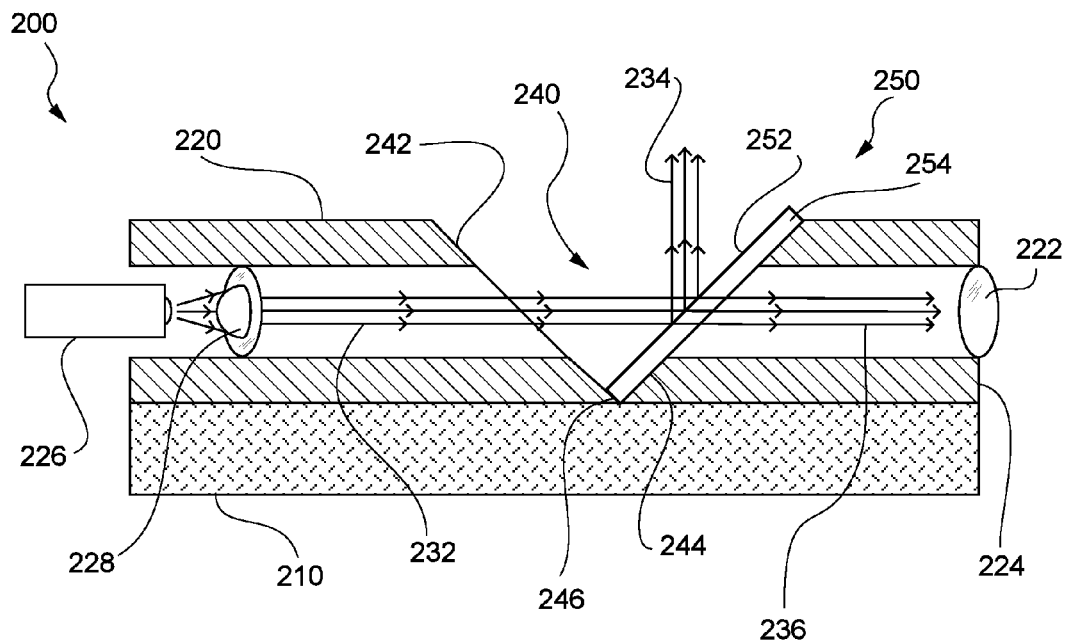
FIG. 5 illustrates the installation of a beamsplitter into a solid core waveguide in accordance with another embodiment of the present invention.

With reference to FIG. 5, illustrated is an exemplary embodiment 200 of the present invention in which a plate beamsplitter 250 has been installed into a solid core waveguide 220. The solid core waveguide can be formed in a printed circuit board 210. Core light passage 222 can be formed of a solid, substantially optically transparent material, such as a polymer and/or dielectric, surrounded by a reflective cladding 224. An optical light source 226, such as a multi-mode laser, can be located at one end of the waveguide and can be coupled with the signal processes of the circuit board to create an optical signal that can be routed around and between circuit boards.

The light source 226 can emit a beam of multi-mode light that travels down the optically transparent core 222. A collimator 228 can be placed within the passage and adjacent the light source, to collimate the multi-mode light into a collimated beam of coherent light rays 232 in which the multiple modes travel substantially in parallel within the solid core waveguide 220. In the alternative, the light source can be butt-coupled directly to the solid core waveguide. Efficient coupling will occur so long as the numerical aperture of the light source is less than the numerical aperture of the optical waveguide.

A beamsplitter 250, in this case a plate beamsplitter, can be inserted into a transverse groove 240 which has been cut into the optical waveguide 220. The groove can be cut with a dicing saw or microdicer having a blade with a diamond-tipped edge, or with any other device capable of making a precision cut to a controlled depth, accurate to within a few micrometers, and leaving a groove with a substantially smoothly-finished front face plane 242 and back face plane 244. Furthermore, the groove also has a bottom notch or registering corner 246 where the two planes come together, which can provide a registered fit for the bottom of the beamsplitter 250.

The numerical aperture of the solid core waveguide depends on the refractive indices of the core and the cladding, and can typically be on the order of 0.22. This means that the beam of light will exit the waveguide at a half cone angle of about 13 degrees. Thus, it can be beneficial to make the groove cut as small as possible so as not to incur too much loss due to diffraction at the optical tap. For example, a 500 μm air gap between 2 solid core waveguides with core index $n_1=1.52$ and cladding index $n_2=1.43$ yields a 8.5 dB coupling loss, while reducing the air gap down to 100 μm yield a coupling loss of only 0.53 dB. If the 500 μm air gap is replaced with a matching adhesive n=1.5, the loss drops from 8.5 dB to 4.7 dB.

The registering corner 246 can assume the same profile as the tip of the blade of the dicing saw. For example, if the dicing saw has a V-shaped blade with two surfaces at 90 degree angles relative to one another (a 90 degree profile), as previously discussed, the registering corner of the groove will have a 90 degree angle. Furthermore, if the blade having a 90 degree profile is aligned to the vertical, the front face 242 and back face 244 will both be aligned at 45 degrees to the horizontal plane of the circuit board. Although the embodiment illustrated in FIG. 5 has a 90 degree profile, the method of the present invention is not limited to microdicer blades having a 90 degree profile, or even to microdicer blades having a V-shaped profile. Any means for cutting a groove having a profile which can precisely accommodate, align and hold a pre-fabricated beamsplitter is considered to fall within the scope of the present invention. This includes V-shaped blades, right angle shaped blades, as well as blades having a square, polygonal or rounded tip shape.

The plate beamsplitter 250 can have a beamsplitter coating 252 applied to a surface of the beamsplitter substrate 254, which substrate can fit into the registered fit formed by the registering corner 246. The transverse groove can be precisely cut to a depth which automatically centers the beamsplitter's optical path with the optically transparent core 222 of the waveguide once the beamsplitter is inserted into the groove 240. The beamsplitter can be sized to rest against the back face plane 244 of the groove, and assume the oblique angle of the back face relative to the incident optical beam 232 emitted from light source 226. Once the incident beam strikes the beamsplitter coating, a reflected portion 234 of the light is directed up through the top opening in the groove and out from the plane of the circuit board, and the remaining transmitted portion 236 of the beam is passed through the beamsplitter coating to continue further along the solid core optical waveguide 220.

As shown in FIG. 5, the beamsplitter coating can be applied to the front surface of the substrate. In the alternative the beamsplitter coating may be applied to the back surface instead. The beamsplitter coating can be formed from a variety of methods which allow control over the overall power tap ratio of the pre-fabricated beamsplitter. These methods can include alternating dielectric layers, selectively reflective portions and clear options, or any other configuration known to one having skill in the art. Moreover, an anti-reflection coating can be applied to the surface of the substrate not covered with the beamsplitter coating to reduce the effect of ghosting.

In one aspect of the present invention, the beamsplitter substrate 254 is formed from a substantially optically transparent material with an index of refraction substantially similar to the index of refraction of the material forming the solid core 222. Matching the index of refraction between the two materials helps to minimize coupling loss and beam walk-off as the transmitted beam of light 236 passes through the interface between the beamsplitter substrate and the solid core.

Figure 6:
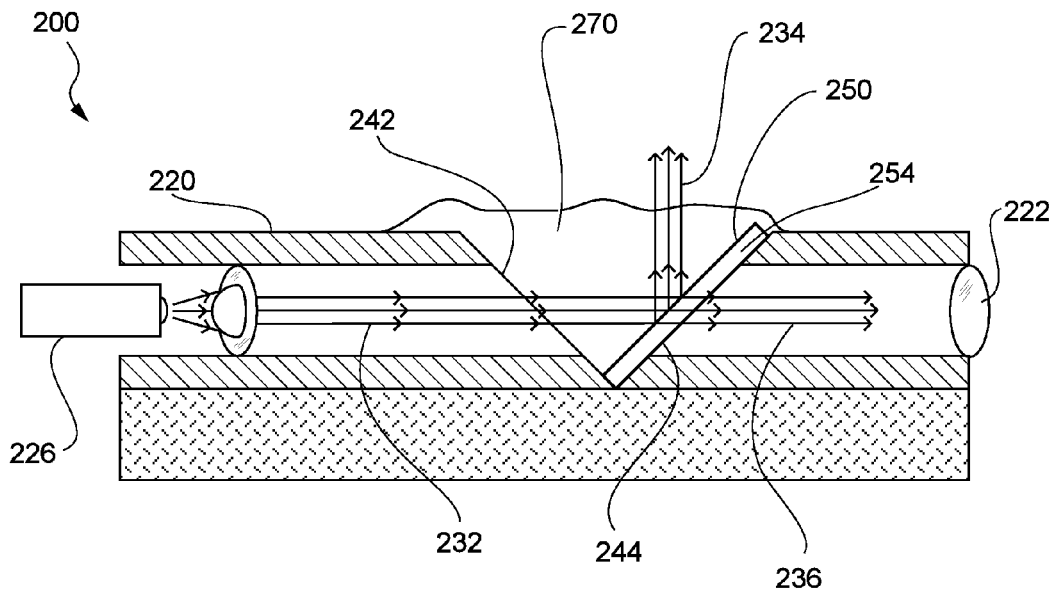
FIG. 6 illustrates the installation of a beamsplitter into a solid core waveguide with an adhesive filling the groove in accordance with an exemplary embodiment of the present invention.

As illustrated in FIG. 6, beam walk-off can be further reduced by filling the remaining empty space between the plate beamsplitter 250 and the front wall of the groove 242 with a substantially optically transparent adhesive 270 that has an index of refraction that substantially matches the index of refraction of the core material 222. The optically transparent adhesive can be made from any material that is transparent to the frequency of the optical beam 232 emitted by the light source 226 and reflected upwards 234 by the beamsplitter. Thus, in the difficult application of forming multiple optical taps in a solid core waveguide 220, refraction of the incident beam of light 232 across each interface can be reduced, beam walk-off can be substantially minimized, and the need for an anti-reflection coating can be obviated by selecting both the adhesive 270 and a beamsplitter substrate 254 material to have indexes of refraction that match the index value of the core material. A thin layer of this same optically transparent adhesive can also be placed between the beamsplitter 250 and the back face of the groove 244 to eliminate any trapped empty pockets of air or vacuum that may affect the passage of the beam of light. In addition to the improvements in optical performance, the index-matching adhesive also serves to secure the beamsplitter against unwanted displacement and to protect the optical tap from contamination by dust particles or other foreign matter.

Figure 7:
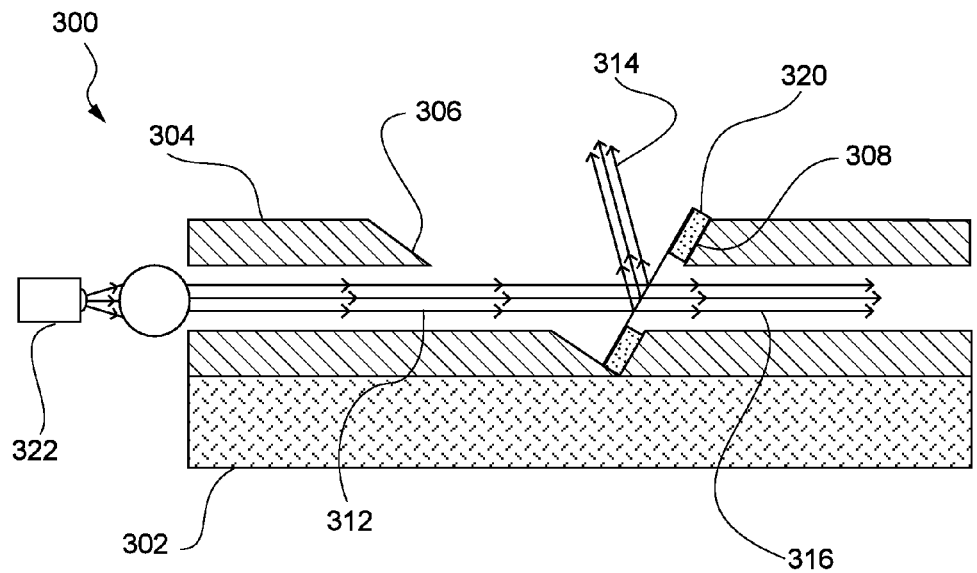
FIG. 7 illustrates a beamsplitter installation in accordance with another embodiment of the present invention.
Figure 8:
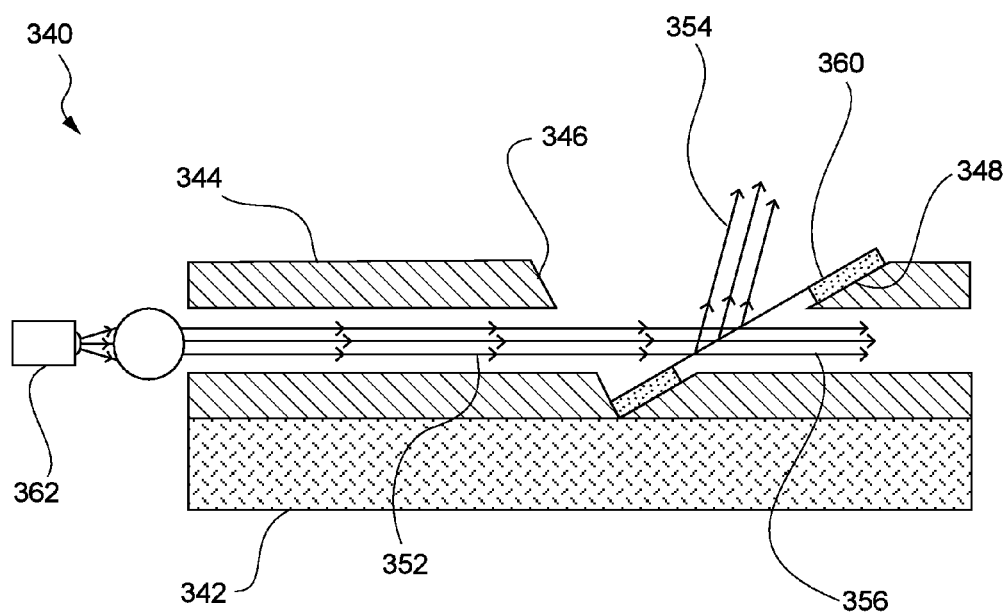
FIG. 8 illustrates a beamsplitter installation in accordance with yet another embodiment of the present invention.

Further illustrated in FIGS. 7 and 8 is the aspect of the present invention that the transverse groove need not have a front face 306 or a back face 308 orientated at 45 degree angle to the plane of the circuit board 203, or in the case of the back face, at an oblique 135 degree angle relative to the incident beam of light 312. Shown in FIG. 7 is an embodiment 300 of the present invention in which the back face plane 308 of the transverse groove can be formed at an oblique angle of less than 135 degrees to the incident beam of light 312, which after installation of the beamsplitter 320 results in a reflected beam 314 that is not perpendicular to the plane of the circuit board, but is instead canted forward toward the optical source 322. This configuration of the transverse groove can be cut by tilting the blade of the microdicer to a non-perpendicular angle, or by re-profiling the tip of the microdicer blade so that its cutting faces match the shape of the finished, non-symmetric groove.

Similarly, the embodiment 340 of the present invention illustrated in FIG. 8 can have a transverse groove with back face plane 348 formed at an oblique angle greater than 135 degrees relative to the incident beam of light 352, which after installation of the beamsplitter 360 results in a reflected beam 354 that is also not perpendicular to the plane of the circuit board 342, but is instead canted backwards away from the optical source 362. In both instances illustrated in FIGS. 7 and 8 the transmitted beams of light 316 and 356 continue down the optical waveguide. The capability of forming the back face of the groove at a non-45 degree angle relative to the plane of the circuit board allows for more flexibility in positioning, relative to the optical waveguide on the circuit board, the daughter cards and other devices which receive the reflected output from the optical tap. This is advantageous in the field of computers and consumers electronics, where space is often at a premium and items cannot be limited to rigid configurations and alignments.

FIG. 9 is illustrative of an exemplary embodiment of the present invention 400, in which multiple optical waveguides 420 are mounted on circuit board 410. The optical waveguides can be arranged in a parallel configuration to form an optical backplane 422 capable of passing optical signals at high speeds with minimal signal loss. The waveguides can be solid core waveguides or large hollow-core waveguides. Using the method of the present invention, optical taps 424 can be installed at various locations along the axial length of the optical backplane to convey a desired portion of the optical signal to perpendicular and removably attached circuit boards, or daughter cards 414. One advantageous aspect of the present invention allows for transverse grooves to be cut at the same axial location in all the optical waveguides forming the backplane, allowing for precise alignment of the several optical taps stemming from the arrangement of waveguides to form a connector location 412.

Figure 10:
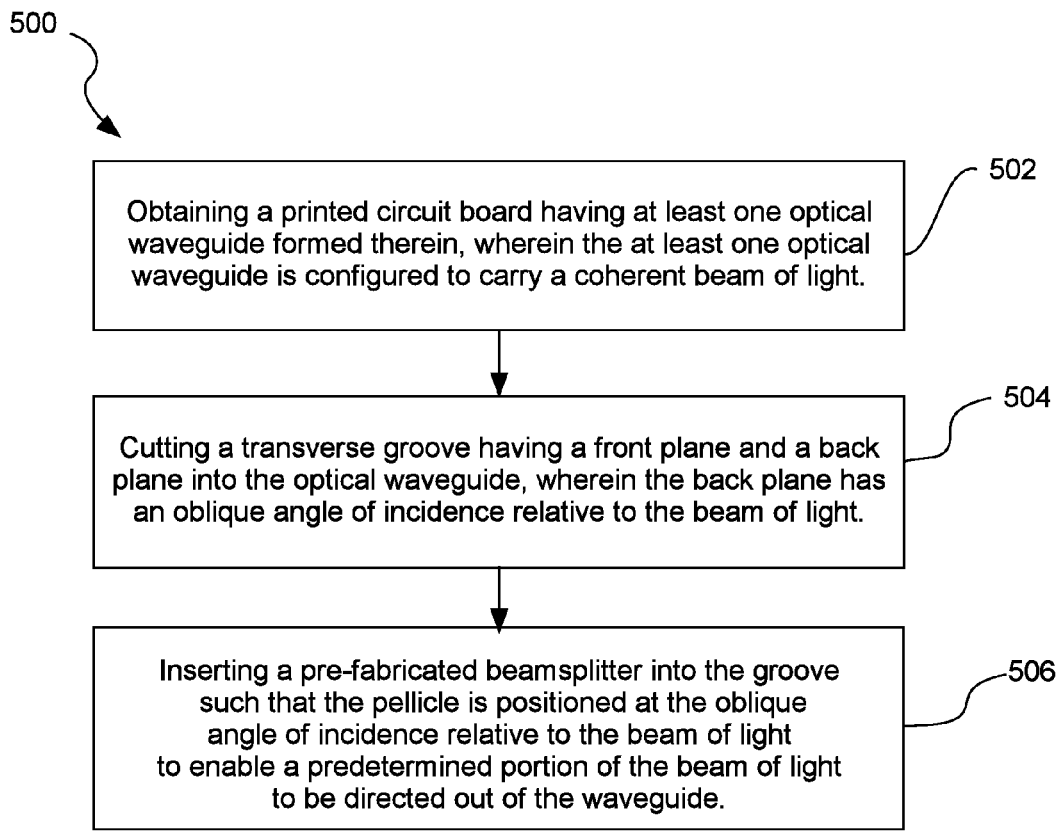
FIG. 10 illustrates a flow chart depicting the method for installing a beamsplitter into a waveguide mounted on a circuit board, in accordance with an embodiment of the present invention

Another embodiment of the present invention provides a method 500 of installing optical taps into board-mounted waveguides, as illustrated in the flow chart of FIG. 10. The method includes the operation of obtaining 502 a printed circuit board having at least one optical waveguide formed therein, wherein the at least one optical waveguide is configured to carry a coherent beam of light. The optical waveguide can be a solid core waveguide having a core made from substantially optically transparent materials, such as polymers and/or dielectrics, that is surrounded by a lower index cladding. The optical waveguide can also be a large core hollow waveguide having a hollow center light passage surrounded by tubular wall surfaces lined with a reflective coating.

The method 500 further includes the operation of cutting 504 a transverse groove having a front plane and a back plane into the optical waveguide, wherein the back plane has an oblique angle of incidence relative to the beam of light. The groove can be cut with a dicing saw or a microdicer, and the oblique angle of incidence of the back face relative to the incident beam of light can be an angle different from 135 degrees.

Finally, the method 500 includes the operation of inserting 506 a pre-fabricated beamsplitter into the groove such that the beamsplitter is positioned at the oblique angle of incidence relative to the beam of light that enable a pre-determined portion of the beam of light to be directed out of the waveguide. The pre-fabricated beamsplitter can be pellicle beamsplitter, a plate beamsplitter or the like. After insertion of the beamsplitter, the optical tap can be protected from contamination by covering the tap with a transparent cover, in the case of a hollow metal waveguide, or filing the groove with a substantially optically transparent adhesive with an index of refraction matching the index of refraction of the core material, in the case of a solid core waveguide.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims.

What is claimed is:

1. A method for installing an optical tap into an optical waveguide formed in a substrate comprising:
   obtaining a substrate having at least one optical waveguide formed therein, wherein the at least one optical waveguide is configured to carry a coherent beam of light;
   cutting a transverse groove having a front plane and a back plane into the at least one optical waveguide, wherein the back plane has an oblique angle of incidence relative to the beam of light;

inserting a pre-fabricated beamsplitter into the groove such that the beamsplitter is substantially positioned at the oblique angle of incidence relative to the beam of light to enable a given predetermined portion of the beam of light to be directed out of the waveguide and to enable another predetermined portion of the beam of light to be directed through the waveguide;

cutting the at least one transverse groove that is V-shaped, and wherein the front plane and the back plane of the at least one transverse groove come together to form a registering corner at the bottom of the groove; and inserting the beamsplitter into the at least one transverse groove until it registers against the registering corner at the bottom of the groove.

2. The method of claim 1, wherein obtaining a substrate having at least one optical waveguide formed therein further comprises obtaining a substrate selected from the group consisting of a printed circuit board, a metallic substrate, a ceramic substrate, a glass substrate and a plastic substrate.

3. The method of claim 1, further comprising inserting a pre-fabricated beamsplitter that is a pellicle beamsplitter.

4. The method of claim 1, further comprising inserting a pre-fabricated beamsplitter that is a plate beamsplitter.

5. The method of claim 1, further comprising cutting at least two transverse grooves and installing at least two beamsplitters into the at least one optical waveguide.

6. A method for installing an optical tap into an optical waveguide formed in a substrate comprising:

obtaining a substrate having at least one optical waveguide formed therein, wherein the at least one optical waveguide is configured to carry a coherent beam of light;

cutting a transverse groove having a front plane and a back plane into the at least one optical waveguide, wherein the back plane has an oblique angle of incidence relative to the beam of light;

inserting a pre-fabricated beamsplitter into the groove such that the beamsplitter is substantially positioned at the oblique angle of incidence relative to the beam of light to enable a given predetermined portion of the beam of light to be directed out of the waveguide and to enable another predetermined portion of the beam of light to be directed through the waveguide; and obtaining a substrate having at least two substantially parallel optical waveguides formed therein, and wherein cutting a transverse groove having a front plane and a back plane further comprises cutting the transverse groove in the at least two substantially parallel optical waveguides at the same time.

7. The method of claim 1, further comprising cutting the groove with a dicing saw.

8. The method of claim 1, wherein cutting a transverse groove further comprises forming a transverse groove using a process selected from the group of embossing and molding.

9. A method for installing an optical tap into an optical waveguide formed in a substrate comprising:

obtaining a substrate having at least one optical waveguide formed therein, wherein the at least one optical waveguide is configured to carry a coherent beam of light;

cutting a transverse groove having a front plane and a back plane into the at least one optical waveguide, wherein the back plane has an oblique angle of incidence relative to the beam of light;

inserting a pre-fabricated beamsplitter into the groove such that the beamsplitter is substantially positioned at the oblique angle of incidence relative to the beam of light to enable a given predetermined portion of the beam of light to be directed out of the waveguide and to enable another predetermined portion of the beam of light to be directed through the waveguide; and cutting the groove so that the oblique angle of incidence of the back face is an angle different from 135 degrees relative to the beam of light.

10. A method for installing an optical tap into an optical waveguide formed in a substrate comprising:

obtaining a substrate having at least one optical waveguide formed therein, wherein the at least one optical waveguide is configured to carry a coherent beam of light;

cutting a transverse groove having a front plane and a back plane into the at least one optical waveguide, wherein the back plane has an oblique angle of incidence relative to the beam of light;

inserting a pre-fabricated beamsplitter into the groove such that the beamsplitter is substantially positioned at the oblique angle of incidence relative to the beam of light to enable a given predetermined portion of the beam of light to be directed out of the waveguide and to enable another predetermined portion of the beam of light to be directed through the waveguide; and cutting the transverse groove into the optical waveguide wherein the optical waveguide is a hollow metal waveguide, and wherein cutting the groove exposes a hollow interior and a perimeter surface of the back plane.

11. The method of claim 10, further comprising coating the perimeter surface of the back plane with an adhesive prior to insertion of the beamsplitter.

12. The method of claim 10, further comprising covering the groove with a transparent cover after inserting the beamsplitter.

13. A method for installing an optical tap into an optical waveguide formed in a substrate comprising:

obtaining a substrate having at least one optical waveguide formed therein, wherein the at least one optical waveguide is configured to carry a coherent beam of light;

cutting a transverse groove having a front plane and a back plane into the at least one optical waveguide, wherein the back plane has an oblique angle of incidence relative to the beam of light;

inserting a pre-fabricated beamsplitter into the groove such that the beamsplitter is substantially positioned at the oblique angle of incidence relative to the beam of light to enable a given predetermined portion of the beam of light to be directed out of the waveguide and to enable another predetermined portion of the beam of light to be directed through the waveguide; and cutting a transverse groove into the optical waveguide wherein the optical waveguide is a solid core waveguide, and wherein cutting the groove exposes a back plane comprising a transparent core material having an index of refraction and a perimeter cladding surface.

14. The method of claim 13, further comprising inserting a pre-fabricated beamsplitter that is a plate beamsplitter having a plate material, wherein the plate material has an index of refraction substantially similar to the index of refraction of the core material.

15. The method of claim 13, further comprising filling a space between the front plane of the groove and the beamsplitter with a substantially optically transparent adhesive having a refractive index number substantially similar to the refractive index number of the core material.

16. A method for installing an optical tap into an hollow metal waveguide integrally formed in a printed circuit board comprising:
- forming a hollow waveguide having a metallized interior on a printed circuit board, wherein the hollow waveguide is configured to carry a coherent beam of light;
- cutting at least one transverse groove having a front face and a back face into the hollow waveguide and wherein an angle of the back face of the groove relative to the beam of light has an oblique angle of incidence; and
- inserting at least one pre-fabricated pellicle beamsplitter into the groove such that the pellicle is positioned at the oblique angle of incidence relative to the beam of light to enable a predetermined portion of the beam of light to be directed out of the hollow waveguide.

17. The method of claim 16, wherein cutting at least one transverse groove further comprises cutting at least one transverse groove that is V-shaped, wherein the front plane and the back plane of the at least one V-shaped transverse groove come together to form a registering corner at the bottom of the V-shaped groove.

18. The method of claim 17, further comprising inserting the at least one pellicle beamsplitter into the at least one V-shaped transverse groove until it registers against the registering corner at the bottom of the groove.

19. A substrate-based optical interconnect comprising:
- a substrate having at least one optical waveguide formed therein, wherein the at least one optical waveguide is configured to carry a coherent beam of light;
- a transverse groove having a front plane and a back plane formed in the at least one optical waveguide, wherein the back plane has an oblique angle of incidence relative to the beam of light; and
- a pre-fabricated beamsplitter positioned in the groove such that the beamsplitter is substantially positioned at the oblique angle of incidence relative to the beam of light to enable a given predetermined portion of the beam of light to be directed out of the waveguide and to enable another portion of the beam of light to be directed through the waveguide;
- wherein the at least one optical waveguide is a solid core waveguide and the pre-fabricated beamsplitter positioned in the transverse groove is a plate beamsplitter, and further wherein the plate beamsplitter is formed from a plate material having an index of refraction substantially similar to an index of refraction of the solid core waveguide.

20. A substrate-based optical interconnect comprising:
- a substrate having at least one optical waveguide formed therein, wherein the at least one optical waveguide is configured to carry a coherent beam of light;
- a transverse groove having a front plane and a back plane formed in the at least one optical waveguide, wherein the back plane has an oblique angle of incidence relative to the beam of light; and
- a pre-fabricated beamsplitter positioned in the groove such that the beamsplitter is substantially positioned at the oblique angle of incidence relative to the beam of light to enable a given predetermined portion of the beam of light to be directed out of the waveguide and to enable another portion of the beam of light to be directed through the waveguide;
- wherein the at least one optical waveguide is a hollow metal waveguide and the pre-fabricated beamsplitter positioned in the transverse groove is a pellicle beamsplitter.

21. The optical interconnect of claim 20, wherein the pellicle beamsplitter positioned in the transverse groove is covered with a transparent cover.

22. The optical interconnect of claim 19, wherein the plate beamsplitter positioned in the transverse groove is covered with a substantially optically transparent adhesive having a refractive index number substantially similar to the refractive index number of the core material.

* * * * *

UNITED STATES PATENT AND TRADEMARK OFFICE
CERTIFICATE OF CORRECTION

PATENT NO. : 8,761,550 B2  
APPLICATION NO. : 12/864228  
DATED : June 24, 2014  
INVENTOR(S) : Michael Renne Ty Tan et al.

Page 1 of 1

It is certified that error appears in the above-identified patent and that said Letters Patent is hereby corrected as shown below:

On the title page, item (56), U.S. Patent Documents, in column 2, lines 8-9,
below "7,082,251 B2" delete " DE 100A1261 10/2001 DE 60302553 6/2006 ".

On the title page, item (56), Foreign Patent Documents, in column 2, line 1,
above "1643413 A" insert -- DE 10013261 A1 10/2001 DE 60301553 T2 6/2006 --.

Signed and Sealed this  
Eleventh Day of November, 2014

Michelle K. Lee  
*Deputy Director of the United States Patent and Trademark Office*